United States Patent [19]

Rieck

[11] Patent Number: 4,581,213

[45] Date of Patent: * Apr. 8, 1986

[54] CRYSTALLINE SILICIC ACID, ITS SALTS, AND PROCESSES FOR THEIR PREPARATION

[75] Inventor: Hans-Peter Rieck, Hofheim am Taunus, Fed. Rep. of Germany

[73] Assignee: Hoechst Aktiengesellschaft, Fed. Rep. of Germany

[*] Notice: The portion of the term of this patent subsequent to Mar. 25, 2003 has been disclaimed.

[21] Appl. No.: 688,454

[22] Filed: Jan. 2, 1985

[30] Foreign Application Priority Data

Jan. 4, 1984 [DE] Fed. Rep. of Germany ....... 3400130

[51] Int. Cl.$^4$ ............................................. C01B 15/14
[52] U.S. Cl. ..................................... 423/325; 423/324; 423/327; 423/328; 423/329; 423/332; 423/333
[58] Field of Search ............... 423/325, 328, 329, 332, 423/333

[56] References Cited

U.S. PATENT DOCUMENTS

| | | | |
|---|---|---|---|
| 4,285,922 | 8/1981 | Audeh et al. ................ | 423/329 |
| 4,430,314 | 2/1984 | Audeh et al. ................ | 423/326 |
| 4,481,174 | 11/1984 | Baacke et al. ............... | 423/306 |

FOREIGN PATENT DOCUMENTS

| | | | |
|---|---|---|---|
| 0042225 | 12/1981 | European Pat. Off. ........... | 423/328 |
| 2742912 | 8/1979 | Fed. Rep. of Germany . | |
| 2125390 | 3/1984 | United Kingdom ................ | 423/328 |

OTHER PUBLICATIONS

Klaus Beneke and Gerhard Lagaly, "Kenyaite–Synthesis and Properties", *American Mineralogist*, vol. 68, pp. 818–826 (1983).
Eugster, *Science*, 157:1177–1180 (1967).
Rooney, *Amer. Mineral.*, 54:1034–1043 (1969).
Maglione et al, *C. R. Acad. Sci.*, (Paris) Ser. D 277:1721–4 (1973).
McAtee et al, *Amer. Mineral*, 53:2061–2068 (1968).
McCulloch, *JACA*, 74:2453–2456 (1952).
Legaly et al, *Proc. Int. Clay Conf.*, 1972, 663–673 (1973).
Iler, J. Colloid Sci., 19:648–657 (1964).
Legaly et al, Z. Naturforsch. 28b:234–238 (1973).
Legaly et al, Z. Naturforsch., 346: 666–674 (1979).
Heydemann, Beitr. Min. Petrogr., 20:242–259 (1964).
Mitsyuk et al, Geochem. Int., 13: 101–111 (1976).
Benecko et al, Z. Naturforsch, 34b: 648–649 (1979).
Legaly, Adv. Colloid Interface Sci., 11:105–148 (1979).

*Primary Examiner*—John Doll
*Assistant Examiner*—Jackson Leeds
*Attorney, Agent, or Firm*—Connolly and Hutz

[57] ABSTRACT

Crystalline sodium silicates having a sheet structure and an ion exchange capacity of 83–130 mmol of $Na^+$/mol of $SiO_2$ are prepared by a method in which an aqueous reaction mixture which contains sodium silicate, has a molar ratio $SiO_2/Na_2O$ of 3.9:1 to 15:1 and a molar ratio $H_2O/(Na_2O+SiO_2)$ of 3:1 to 80:1 and contains 0.01 to 30% by weight, relative to the amount of $SiO_2$ in the reaction mixture employed, of seed crystals of the desired crystalline sodium silicate is prepared, the mixture is heated to temperatures of 160° to 250° C., the reaction is carried out at least until, in the X-ray diffraction pattern of a sample filtered off under suction and dried at 120° C., the ratio of the intensity of the reflection at the interplanar spacing $d_1=(20\pm2)\cdot 10^{-8}$ cm to the intensity of any reflection present at the interplanar spacing $d_2=(15.5\pm1.5)\cdot 10^{-8}$ cm is at least 3:1, and the reaction is terminated before the intensity of the reflection at the interplanar spacing $d_3=(3.34\pm0.04)\cdot 10^{-8}$ cm reaches or exceeds the intensity of the reflection at the interplanar spacing $d_4=(3.44\pm0.04)\cdot 10^{-8}$ cm. A crystalline silicic acid having a sheet structure and the overall composition $H_2Si_xO_{2x+1}$, wherein $15<x<24$, and its sodium salt are described.

7 Claims, No Drawings

CRYSTALLINE SILICIC ACID, ITS SALTS, AND PROCESSES FOR THEIR PREPARATION

The invention relates to a novel crystalline silicic acid having a sheet structure, its novel crystalline sodium salt, and processes for the preparation of these compounds in an aqueous medium.

In addition to amorphous silicic acids, a few crystalline silicic acids are also known. It is possible to differentiate between silicic acids having a framework structure and silicic acids having a sheet structure. The silicic acids having a framework structure can include those zeolites, in their hydrogen form, which are free of aluminum or at least have a very low aluminum content. This includes silicalite (U.S. Pat. No. 4,061,724) as a typical example of a ZSM-5 zeolite with a very low aluminum content, or dealuminized zeolites of the faujasite or mordenite type.

Some sheet-type silicic acids are also known, their alkali metal salts having been found to occur naturally (H. P. Eugster, Science, 157, 1177–1180; T. P. Rooney et al., Amer. Mineral., 54. 1034–1043 (1969); G. Maglione and M. Servant, C. R. Acad. Sci., Ser. D., 277, 1721–1724 (1973) and J. L. McAtee, Jr. et al., Amer. Mineral., 53 (1968), 2061–2069). These salts can also be synthesized ((L. McCulloch, J. Amer. Chem. Soc. 74, 2453–2456 (1952); G. Lagaly, K. Benecke and A. Weiss, Proc. Int. Clay Conf., Madrid 1972, 663–673 (1973), R. K. Iler, J. Colloid Sci. 19, 648–657 (1964), German Pat. No. 2,742,912, G. Lagaly et al., Z. Naturforsch. 28b, 234–238 (1973) and Z. Naturforsch. 34b, 666–674 (1979), and K. Beneke and G. Lagaly, Amer. Mineral., 68 (1983) 818–826). The sheet structure may also be called layer structure.

The free silicic acids can be obtained from the alkali metal silicates by acidic ion exchange. In this procedure, the sheet structure of the compound is retained. A characteristic feature of this type of silicic acid or silicates is their ability to incorporate guest molecules between the layers of the crystalline hydrated silicon dioxide. From the X-ray diffraction pattern, it is possible to deduce that the layers have moved further apart in this case.

The silicic acid which has a sheet structure and is described in German Pat. No. 2,742,912 can be used as an adsorbent in pure form or in the form of its intercalation compounds.

The object was to find a process by means of which similar silicic acids and alkali metal sheet silicates can be prepared in a simple manner from readily obtainable starting materials. The process should be capable of being carried out with short reaction times of not more than 2 days, in order to permit economical industrial production. It should also lead to a product which is as free as possible of quartz and amorphous components.

This object is achieved by the present invention. The latter relates to a process for the preparation of a crystalline sodium silicate having a sheet structure and an ion exchange capacity of 83 to 130 mmol of $Na^+$/mol of $SiO_2$, wherein an aqueous reaction mixture which contains sodium silicate, has a molar ratio $SiO_2/Na_2O$ of 3.9:1 to 15:1 and a molar ratio $H_2O/(Na_2O+SiO_2)$ of 3:1 to 80:1 and contains 0.01 to 30% by weight, relative to the amount of $SiO_2$ in the reaction mixture employed, of seed crystals of the desired crystalline sodium silicate is prepared, this reaction mixture is heated to temperatures of 160° to 250° C., the reaction is carried out at least until, in the X-ray diffraction pattern of a sample filtered off under suction and dried at 120° C., the ratio of the intensity of the reflection at the interplanar spacing $d_1=(20\pm2)\cdot10^{-8}$ cm to the intensity of any reflection present at the interplanar spacing $d_2=(15.5\pm1.5)\cdot10^{-8}$ cm is at least 3:1, and the reaction is terminated before the intensity of the reflection at the interplanar spacing $d_3=(3.34\pm0.04)\cdot10^{-8}$ cm reaches or exceeds the intensity of the reflection at the interplanar spacing $d_4=(3.44\pm0.04)\cdot10^{-8}$ cm.

Suitable starting materials are mixtures of sodium hydroxide and precipitated silicic acid, silica gel or silica sol. However, the use of soda waterglasses, in particular of waterglasses containing 21 to 30% by weight of $SiO_2$ and from 5 to 10% by weight of $Na_2O$, is preferred. These waterglasses are economical, are easy to handle and exhibit high reactivity.

It may be necessary to increase the ratio $SiO_2/Na_2O$ by adding an acidic compound. The amount neutralized in this manner makes no further contribution to the ratio $SiO_2/Na_2O$.

The reaction time depends to a great extent on the reaction temperature. It can be less than 1 hour at temperatures between 200° and 250° C., but (in the case of lower temperatures and a low $SiO_2/Na_2O$ ratio) may be up to 48 hours. The reaction time can be determined for the chosen reaction temperature by taking samples at various times during the reaction and examining these by X-ray analysis. This is preferably first carried out using a small model batch. The reflections at the interplanar spacings $d_1$ and $d_4$ are attributable to the desired sodium silicate having a sheet structure (I). Their intensity (i.e. the amount of crystalline sodium silicate produced in the product mixture) should therefore be as high as possible. The reflection at the interplanar spacing $d_2$ is not observed when suitable reaction conditions are chosen from the outset. In this case, the ratio of the intensities of the reflections at $d_1$ and $d_2$ is substantially higher than 3. The reflection at $d_2$ is observed when magadiite is formed as an intermediate product. However, magadiite is unstable under the process conditions, so that the intensity of $d_2$ can pass through a maximum. Advantageously, the reaction time is prolonged to such a great extent that a reflection no longer occurs at $d_2$. An identical result can also be obtained by increasing the temperature for the same reaction time. For a long reaction time, the intensity of the reflection at the interplanar spacing $d_3$ is attributable in part to quartz (sharp peak in the spectrum), but for the larger part generally to the desired silicate (ill-defined maximum in the spectrum).

The molar ratio $SiO_2/Na_2O$ (unneutralized) is preferably 5:1 to 10:1. The molar ratio $H_2O/(Na_2O\pm SiO_2)$ is preferably 8:1 to 40:1. The reaction temperature is preferably 175° to 230° C., in particular 180° to 210° C.

In addition to the sodium ions, it is also possible for other metal ions to be present during the synthesis, for example germanium, aluminum, indium, arsenic and antimony, and the non-metals phosphorus and boron. Provided that the amount of these components is less than 10%, relative to the sodium content, the synthesis is not significantly affected. In preparing a pure sodium silicate having a sheet structure (I), or the free acid (II), it is advantageous to dispense with the addition of foreign metals during the synthesis. Pure sheet silicates containing a cation other than an alkali metal (Ia) can readily be obtained in a further step by subjecting the sodium salt (I) to ion exchange or by neutralizing the appropriate free acid (II).

Larger amounts of aluminum in the starting mixture can lead to the formation of zeolite by-products, generally of the ZSM-5 type or of the mordenite type. On the other hand, a low aluminum content, as is present, for example, in technical-grade waterglass, does not have an adverse effect.

Owing to the high steam partial pressure present during the reaction, the latter is carried out in a pressure vessel, preferably with stirring. The addition of seed crystals is essential. However, the same silicate (in less pure form) is formed during longer reaction times, even without the use of seed crystals.

In the batchwise reaction procedure, the amount of seed crystals is preferably 0.5–10% by weight, based on the amount of $SiO_2$ in the reaction mixture employed. The addition of amounts of seed crystals of less than 0.01% by weight has no recognizable effect. Instead of adding seed crystals, it may also be sufficient if small residues from a previous batch remain in the reaction vessel. In the continuous reaction procedure, higher concentrations of crystal nuclei (in steady-state equilibrium) have also proven advantageous. The addition of seed crystals has an advantageous effect on the purity of the product and substantially shortens the reaction time.

The process according to the invention can be carried out batchwise, semi-continuously and continuously in apparatuses possessing flow-tube, stirred-kettle or cascade characteristics. Compared with the known processes, it has the advantage of a very short reaction time and at the same time leads to very good product quality. Photographs taken with a scanning electron microscope show that the products prepared by the process according to the invention do not contain any amorphous or quartz-containing components.

The crystalline sodium salt (I) which is obtained by the process according to the invention and is called Na-SKS-1 (sodium salt of the sheet-type silicic acid 1) possesses a sheet structure, exhibits at least one very strong line at $(3.42\pm0.15)\cdot10^{-8}$ cm in the X-ray diffraction pattern, and has an atomic ratio sodium/silicon of 0.083 to 0.13. This corresponds to an empirical formula $Na_2Si_xO_{2x+1}$, wherein x represents a number between 15 and 24.

The sodium salt (I) obtained behaves like a cation exchanger. The exchange capacity (after conversion so that it relates to the anhydrous product) is in the range from 132 to 203 mmol of sodium per 100 g, and in particular in the range from 132 to 173 mmol per 100 g. It is determined by titration of the sodium salt with an acid, and back-titration of the resulting acid with an alkali. For a synthetic magadiite (as test substance), the same method of measurement gives the Na/Si ratio known from the literature. The broadness of the stated ranges is due partly to the reproducibility and partly to small amounts of by-products in the crystalline sodium silicate.

It is assumed that the pure product (I) has an exchange capacity of 145 mmol of sodium per 100 g, and possesses the ideal composition $Na_2Si_{22}O_{45}$.

As can be seen from Table 2, the X-ray spectrum of the sodium salt (I) resembles the spectra of kenyaite, of $SiO_2$-X (Heydemann, Beitr. Min. Petrog. 10, 242–259 (1964)), of "$SiO_2$ ($X_2$-phase)", a silicate from a high-pressure synthesis with a very low exchange capacity (B. Mitsyuk et al., Geochem. Int. 13, 202 (1976)) and of $K_2Si_8O_{17}.xH_2O$ (German Pat. No. 2,742,912). This shows that the sheet-type alkali metal silicates $Na_2Si_2.2O_{45}.xH_2O$ (kenyaite), $SiO_2$-X, $SiO_2$ ($X_2$ phase), $K_2SiO_{17}.xH_2O$ and Na-SKS-1 must possess structural similarities, and all of the sheet silicates listed can be considered as kenyaite-like silicates with regard to their X-ray diffraction pattern. The pronounced similarity between $SiO_2$-X and $K_2Si_8O_{17}.xH_2O$ or the corresponding free acid is pointed out by Benecke and Lagaly (Z. Naturforsch. 34b, 648–649 (1979)). The composition of Na-SKS-1 determined by elemental analysis also indicates the relationship between the sodium salt according to the invention and the mineral kenyaite. However, substantial differences appear in the titration behavior with acids. While Na-SKS-1 has an ion exchange capacity of 83–130 mmol of $Na^+$/mol of $SiO_2$ and can be converted to the free acid (H-SKS-1) with an approximately equivalent amount of hydrochloric acid, the mineral kenyaite is converted with dilute acid to 6 $SiO_2.H_2O$, with a corresponding (theoretical) ion exchange capacity of the acid of 333 mmol of $H^+$/mol of $SiO_2$. However, this hydrated $SiO_2$ differs clearly, not only in its ion exchange capacity, but also in its X-ray diffraction pattern, from the free silicic acid H-SKS-1 which has a sheet structure and is formed in the present case. This different behavior compared with acids shows that the natural sheettype sodium silicate, kenyaite, found by Eugster is not identical to Na-SKS-1.

According to German Pat. No. 2,742,912, $K_2Si_8O_{17}.xH_2O$ has an exchange capacity of 250 mmol of $K^+$/mol of $SiO_2$. For $SiO_2$ ($X_2$ phase), an exchange capacity of 100–130 mg of $Na^+$/100 g of $SiO_2$-$X_2$ is stated in the literature. This corresponds theoretically to an exchange capacity of about 62–81 mmol of $Na^+$/mol of $SiO_2$. This comparison shows that, in addition to the important reflections in the X-ray diffraction pattern, information about the ion exchange capacity is also required for an unambiguous characterization of a crystalline silicic acid.

The other crystalline alkali metal salts (Ia) of the silicic acid with a sheet structure, for example the potassium and the lithium salt, likewise have a very strong line at $(3.42\pm0.15)\cdot10^{-8}$ cm and possess an atomic ratio of alkali metal/silicon of 0.083 to 0.13. They can be obtained from the sodium salt (I) by ion exchange, or from the free silicic acid (II) with a sheet structure by neutralization with an alkali metal hydroxide.

To obtain the free crystalline silicic acid H-SKS-1 (II), it is most advantageous to use dilute aqueous mineral acids. For complete conversion, the amount of protons must be at least equimolar relative to the amount of alkali metal ions to be removed. It is preferable to use excess acid. It is particularly advantageous to add the acid in portions to the alkali metal silicate (I) to be worked up, to separate off the reaction solution, containing the alkali metal ions, from the residue, and to repeat this process several times. In order to reduce the time required for complete ion exchange, it is advisable to stir the reaction mixture. It is advantageous if the pH reaches about 2.0 during the reaction.

The silicic acid H-SKS-1 formed can be filtered off and, if required, dried, for example in a drying oven at 140° C. Drying is not necessary if the acid is to be processed further, for example if it is to be converted to a potassium salt.

The crystalline silicic acid H-SKS-1 obtained by the process according to the invention is novel. It has the empirical formula $H_2Si_xO_{2x+1}$, wherein x is a number between 15 and 24. Any water which may be present is not taken into account in this formula. The freshly prepared crystalline silicic acid contains approx. 10 to 60% by weight of water before being dried. During the drying procedure, this water content decreases continuously, and finally approaches 0%. The crystalline silicic acid is distinguished by a very strong first line at $d=(3.42\pm0.1)\cdot10^{-8}$ cm in the X-ray diffraction pattern and by a further line at $d=(18\pm4)\cdot10^{-8}$ cm, the intensity of which is not more than 75% of the intensity of the first line. Furthermore, it has a titratable acidity of 83 to 130 mmol of $H^+$/mol of $SiO_2$, which conforms to the stated structural formula. In general, the acidity observed is in the range from 83 to 105 mmol of $H^+$/mol of $SiO_2$.

The X-ray diffraction pattern of the novel crystalline silicic acid H-SKS-1 exhibits few lines. The product is clearly distinguished from amorphous silicic acid by the broad intense line at an interplanar spacing of about $3.42\cdot10^{-8}$ cm. According to the literature, lines in the region of $(3.2$ to $3.6)\cdot10^{-8}$ cm and $(11$ to $21)\cdot10^{-8}$ cm are typical of silicic acids with a sheet structure. It is therefore assumed that the silicic acid according to the invention also has a sheet-like crystal structure. The intensity of some X-ray reflections, in particular the reflection at $d=(18\pm4)\cdot10^{-8}$ cm, is dependent on the water content of the silicic acid. However, a characteristic feature is the fact that the intensity of the reflection at $d=(18\pm4)\cdot10^{-8}$ cm is not more than 75% of that of the reflection at about $3.42\cdot10^{-8}$ cm. The novel silicic acid can be differentiated from the known crystalline silicic acids by means of its X-ray diffraction pattern and/or its specific ion exchange capacity.

In Table 1, the X-ray diffraction pattern of the novel silicic acid (II) is compared with the X-ray diffraction patterns of three known silicic acids, i.e. with $H_2Si_8O_{17}\cdot xH_2O$ (German Pat. No. 2,742,912), with $H_2Si_{14}O_{29}\cdot xH_2O$ (Lagaly et al., Z. Naturforsch. 28 b (1973), 234–238) and with the silicic acid SH, which is obtained by acidification of the minerals magadiite and kenyaite (Eugster, Science 157 (1967), 1177–1180). The novel silicic acid H-SKS-1 possesses similarities to $H_2Si_8O_{17}\cdot xH_2O$ in the X-ray diffraction pattern. However, it differs clearly from this acid in ion exchange capacity. While $H_2Si_8O_{17}\cdot xH_2O$ has about 250 mmol of exchangeable protons per mol of $SiO_2$, the novel silicic acid has a substantially lower exchange capacity. This is not more than 130 mmol of $H^+$/mol of $SiO_2$, and is in general higher than 83 mmol of $H^+/SiO_2$. Typical values are 83 to 105 mmol (in particular 88 to 99 mmol) of exchangeable $H^+$/mol of $SiO_2$. An ideal composition of $H_2Si_{22}O_{45}$ can therefore be assumed.

The new products can be used in the same way as the layer silicates already known, e. g. as adsorbents.

TABLE 1

X-ray diffraction pattern for various silicic acids

| $H_2Si_8O_{17}\cdot xH_2O$ | | $H_2Si_{14}O_{29}\cdot xH_2O$ | | SH | | H—SKS-1 (Example 5) | |
|---|---|---|---|---|---|---|---|
| d ($10^{-8}$ cm) | I/Io | d ($10^{-8}$ cm) | I/Io | d ($10^{-8}$ cm) | I/Io | d ($10^{-8}$ cm) | I/Io |
| 18.4 | 100 | | | | | 18.0 | 33 |
| | | 13.2 | 80 | 13.6 | 100 | | |
| 9.02 | 70 | | | | | 8.93 | 9 |
| 7.25 | 25 | 7.36 | 60 | | | 7.40 | 7 |
| | | | | 6.86 | 45 | | |
| 6.56 | 10 | | | | | | |
| | | | | 6.13 | 12 | | |
| 5.97 | 10 | | | | | | |
| | | 4.67 | 20 | 4.70 | 25 | | |
| 4.44 | 10 | | | | | 4.42 | 7 |
| | | 4.09 | 30 | 4.12 | 35 | | |
| 3.80 | 10 | | | | | 3.86 | 15 |
| 3.68 | 10 | 3.70 | 60 | 3.66 | 30 | 3.69 | 20 |
| | | | | 3.57 | 30 | 3.57 | 25 |
| 3.49 to 3.30 | 100 | 3.42 | 100 | 3.43 | 75 | 3.41 | 100 |
| | | | | 3.26 | 10 | 3.21 | 20 |
| | | 2.63 | 10 | | | | |
| 2.52 | 10 | | | | | | |

The ion exchange capacity of the novel silicic acid H-SKS-1 (II) is determined by titration with sodium hydroxide solution (most advantageously after the addition of an aqueous sodium chloride solution). The point of inflection in the plotted titration curve gives the equivalence value in the region of pH 8 to 11. The titration of the corresponding alkali metal salt (Ia) e.g. (I) with hydrochloric acid (point of inflection in the region of pH 2 to 5) serves as a control, and gives similar values. When the same titration with hydrochloric acid is carried out using a known magadiite-like silicate, it gives an exchange capacity which is substantially higher but expected for this sheet silicate, and thus confirms the applicability of the method of investigation.

By determining the loss on ignition (at above 1,000° C.), the exchange capacity can be converted to correspond to the anhydrous form. For the novel silicic acid (II) free of water of crystallization, this corresponds to an ion exchange capacity of 137 to 212 mmol of $H^+$/100 g of silicic acid, or 137 to 172 mmol of $H^+$/100 g, and in particular 145 to 162 mmol of $H^+$/100 g. In this case, too, the results are affected by impurities in the product and the precision of the method of measurement.

The fact that the degree of condensation of $SiO_2$ is higher in comparison with $H_2Si_8O_{17}$ and the content of acidic Si-OH groups is correspondingly lower gives rise to different chemical and physical properties. While $H_2Si_8O_{17}\cdot xH_2O$ is sensitive to acids and thermally unstable, and therefore should be stored at low temperatures, the same does not apply to the novel silicic acid (H-SKS-1). Small differences can also be found in the behavior during titration and during dehydration.

The semicontinuous and completely continuous preparation of the crystalline sheet-type sodium silicate (I) in a stirred kettle or a stirred kettle cascade is to be described in detail below.

In general, the continuous embodiment of the process according to the invention is carried out at temperatures above 175° C. Because of the pressure generated above the aqueous reaction mixture, an autoclave is necessary. Further increase in the pressure by the addition of an inert gas has no advantages. The temperature of the reaction mixture should be in the range from 130 to 230° C., in particular 160° to 210° C., even during the addition of the reactants. This can be effected particularly easily if the substances added have been heated up beforehand. The pressure in the reaction vessel should be below 100 bar, in general in the range from 5 to 25 bar.

Pumps are required for metering the reactants into the reaction vessel. A single pump may be sufficient for this purpose; however, it is also possible to add individual components separately, so that 2 or even 3 pumps are required at different feed points of the autoclave. It is preferable for the acidic compound (for example sulfuric acid or phosphoric acid) and the basic reactants (water-soluble alkali metal silicates or alkali) to be metered in separately in order to avoid gel formation outside the reaction vessel. If an excess of the acidic compound is metered in, it may also be necessary to add an alkali.

The starting materials can be added in succession. However, simultaneous addition is preferred. If a plurality of reaction kettles connected in series is employed, it is advantageous if the duration of the addition for each component is 10 to 100%, in particular 20 to 80%, of the residence time in the first stirred kettle.

If, during the addition, product is not removed at the same time, the content of the stirred vessel increases. The addition must then be terminated no later than when the maximum level is reached. When the components are added very rapidly, stirring must be continued for a further period in the reaction vessel in order to achieve adequate formation of the crystalline silicate by subsequent crystallization. The product is then removed from the still hot autoclave. However, it may be advantageous to carry out this subsequent crystallization in a further vessel, or in further vessels, which, if required, are likewise equipped with stirrers, so that a (stirred kettle) cascade results. The duration of the subsequent crystallization should be no more than 99 times, preferably no more than 20 times, in particular (at high temperatures above 200° C.) only 9 times, and preferably less than 4 times, the mean residence time in the first stirred kettle. Moreover, the subsequent crystallization can be carried out at temperatures which are substantially lower than the temperature in the first stirred kettle.

In the continuous reaction procedure, it is advantageous if the autoclave is not completely emptied but is always kept at least partially filled with product mixture which consists of the crystallized silicate, the mother liquor and unreacted starting materials. As a result, a large amount of silicate crystals remains in the autoclave and promotes the further formation of crystalline silicate.

In the continuous reaction procedure, seed crystals are added only during the start-up period (to establish the equilibrium). During the reaction, the weight ratio of alkali metal silicate crystals to dissolved $SiO_2$ in the reaction mixture should be higher than 0.05, preferably higher than 0.1, and in particular higher than 0.2. In the completely continuous reaction procedure, constant values, in general higher than 1.0, are maintained.

In the semi-continuous reaction procedure, the value exceeds and falls below a mean value in a periodic manner.

In the completely continuous reaction procedure, and with ideal mixing, it is possible for substantially more crystalline silicate than dissolved silicate to be present in both the stirred kettle and the discharged product.

If the product is to be removed from an autoclave which is still under pressure, this can be achieved by means of an appropriate outlet valve in the base. If complete emptying is not desired, the product is advantageously removed via a syphon tube which dips into the reaction mixture and is closed by means of a valve. The maximum amount of product which can be removed is determined by the length of the syphon tube.

Advantageously, the process according to the invention is operated completely continuously. In addition to the continuous feeding of the starting components, this procedure requires continuous discharge of the reaction products. This can be effected, for example, by means of a syphon tube. To monitor the reaction vessel, it may be necessary to monitor the level by means of a level indicator or by determining the weight of the apparatus.

For economic reasons, both in batch operation and in the continuous procedure, the reaction time is generally such that at least 10% of the alkali metal silicate added is converted to the sheet-type alkali metal silicate. Short reaction times are required at higher reaction temperatures. At temperatures above 180° C., times of less than 1 hour are occasionally sufficient. However, reaction times of several days may also be required. The required reaction times, which are dependent on the particular reaction conditions, can be determined from X-ray diffraction patterns of individual samples. Using the process according to the invention, it is possible to prepare silicates which exhibit exclusively the X-ray reflections typical of crystalline sheet silicates.

The ratio of (formed) crystalline to (added) dissolved silicate is principally determined by the mean residence time and the composition (in particular the molar ratio of $Na_2O/SiO_2$). An increase in the mean residence time results in an increase in the amount of crystalline material but occasionally also promotes the formation of by-products. For economic reasons, it may be practical to employ shorter residence times and accept a lower amount of crystalline product.

To isolate the sheet silicate, the reaction mixture is filtered after the reaction, and the residue is washed with water or dilute alkali (depending on the alkali metal silicate) and, if required, is dried. However, for some further processing it may also be advantageous to process the filter-moist product directly, for example to exchange the alkali metal ions for other cations by treatment with salt solutions.

EXAMPLE 1

A reaction mixture having the molar composition $0.303\ Na_2O:0.0052\ Al_2O_3:SiO_2:XH_2O$ is first prepared by adding 83.5 parts by weight of soda waterglass (27% of $SiO_2$, 8.43% of $Na_2O$ and 0.24% of $Al_2O_3$ to 149 parts of water. Thereafter, some of a filter-moist crystalline sodium silicate from a previous experiment (71% weight loss as a result of heating to 1,200° C.; only the amount of water was taken into account in calculating the molar composition) is added. 4.93 parts of 96% strength sulfuric acid are then added slowly, while stirring. The reaction mixture then has the following molar composition: 0.174 $Na_2O$:0.0052 $Al_2O_3$:$SiO_2$:0.129 $Na_2SO_4$:30 $H_2O$.

The reaction mixture is then heated to 205° C. in the course of 1.5 hours in a stainless steel autoclave, after which it is kept at this temperature. From time to time, samples are taken and investigated. After the mixture has been heated for 2.5 hours at 205° C., it is allowed to cool slowly. A sample taken at this time and dried at 120° C. shows a reflection having a relative intensity of 56 at an interplanar spacing $d_1=20.5 \cdot 10^{-8}$ cm, no reflection at $d_2=15.5 \cdot 10^{-8}$ cm, a reflection having a relative intensity of 46 at $d_3=3.34 \cdot 10^{-8}$ cm, and a reflection having a relative intensity of 100 at $d_4=3.44 \cdot 10^{-8}$ cm. After cooling, the reaction mixture is filtered, and the residue is washed with water and sucked dry on a filter. The filter-moist product has a loss on ignition of 55%. The product is dried for a short time in the air and then investigated thermogravimetrically. When the temperature reaches about 140° C. a weight loss of 43% has occurred. No further significant weight loss is observed up to about 1,000° C. The product (I) dried at 120° C. to constant weight has the following composition determined by elemental analysis: 3.8% of Na, 0.24% of Al, 41.5% of Si and 0.003% of Fe. This gives a molar $SiO_2/Na_2O$ ratio of 17.9. The molar $SiO_2/Al_2O_3$ ratio of 332 shows that, in spite of the presence of dissolved $Al_2O_3$ in the reaction mixture, this is incorporated in the end product only in very small amounts. The X-ray diffraction pattern of the sodium silicate (I) dried in the air is shown in Table 2.

TABLE 2

| Kenyaite | | $K_2Si_8O_{17}$ | | $SiO_2$—X | | $SiO_2$ ($X_2$ phase) | | Na—SKS-1 (Example 1) | |
|---|---|---|---|---|---|---|---|---|---|
| 19.7 | 100 | 20.1 | 100 | 18.0 | 20 | 19.3 | 90 | 20.5 | 56 |
| 9.93 | 50 | 10.2 | 30 | 8.93 | 10 | 9.7 | 20 | 10.0 | 11 |
| 7.78 | 2 | 7.31 | 15 | 7.32 | 12 | 7.25 | 10 | 7.31 | 4 |
| 6.62 | 6 | 6.68 | 15 | | | | | | |
| | | | | 6.30 | 16 | 6.38 | 15 | | |
| 5.64 | 8 | 5.45 | 15 | | | | | | |
| 5.14 | 12 | | | 5.11 | 12 | | | | |
| 4.97 | 35 | | | | | 5.03 | 10 | 4.99 | 13 |
| | | | | | | 4.83 | 10 | | |
| 4.69 | 30 | | | | | | | | |
| 4.47 | 6 | | | | | | | | |
| | | | | 4.37 | 6 | | | | |
| | | 4.29 | 30 | | | | | | |
| | | 4.10 | 40 | | | | | | |
| 3.95 | 10 | | | | | | | | |
| | | 3.82 | 15 | | | 3.86 | 10 | | |
| 3.75 | 6 | | | | | | | | |
| 3.64 | 20 | 3.66 | 15 | 3.64 | 6 | | | 3.64 | 22 |
| 3.53 | 20 | | | | | | | 3.52 | 31 |
| 3.43 | 85 | 3.43 | 90 | 3.42 | 100 | 3.42 | 100 | 3.44 | 100 |
| 3.32 | 45 | | | | | | | 3.34 | 46 |
| 3.20 | 55 | 3.19 | 60 | | | 3.20 | 40 | 3.21 | 53 |
| 2.93 | 14 | 2.91 | 40 | | | 2.94 | 10 | 2.94 | 16 |
| | | | | | | 2.88 | 10 | | |
| 2.83 | 12 | | | | | | | | |
| 2.65 | 4 | 2.64 | 15 | | | | | | |

EXAMPLE 2

Hydrochloric acid is added gradually to the product from Example 1 at room temperature until the pH of 2.0 is reached. The reaction mixture is stirred for about 15 minutes and filtered, and dilute hydrochloric acid is once again added to the filter residue until the pH reaches 2. The crystalline silicic acid formed is filtered, thoroughly washed twice with water, filtered once again and sucked dry. The loss on ignition of the filter-moist product is 34.9%. 190 g of a 5% strength NaCl solution are added to 100 g of the moist silicic acid, and the mixture is then titrated with 1 M NaOH. Table 7 shows the titration values. In the graph, an equivalence value of 155 meq/100 g of ignited product is determined from the point of inflection of the curve at pH 9.5. From this, an ion exchange capacity of about 94 mmol of $H^+$/mol of $SiO_2$, corresponding to an $SiO_2$:$2H^+$ ratio or $SiO_2$: $Na_2O$ ratio, of 21:1, is determined.

EXAMPLE 3

The product from Example 1 is extracted twice with 4% strength hydrochloric acid at 80° C. for 15 minutes. The X-ray diffraction pattern of the filter-moist product is shown in Table 3. Investigation by differential thermal analysis indicates a clearly defined transformation at about 120° C. and a much less well defined endothermic transformation at about 1,180° C.

TABLE 3

| d ($10^{-8}$ cm) | I/Io |
|---|---|
| 16.1 | 19 |
| 7.89 | 5 |
| 5.21 | 12 |
| 3.85 | 15 |
| 3.53 (S) | 27 |
| 3.39 | 100 |
| 3.22 (S) | 17 |

S = shoulder

EXAMPLE 4

An excess of sodium hydroxide solution is added to the filter-moist product from Example 3. The mixture is stirred for 1 hour, and the product is filtered off under suction and washed with a small amount of water. The X-ray diffraction pattern of the product dried at 120° C. is shown in Table 4.

TABLE 4

| d ($10^{-8}$ cm) | I/Io |
|---|---|
| 19.8 | 62 |
| 9.87 | 13 |
| 7.31 | 5 |
| 6.37 | 3 |
| 4.98 | 11 |
| 4.69 | 10 |
| 4.27 | 9 |
| 3.66 | 19 |
| 3.50 | 31 |
| 3.44 | 100 |
| 3.35 | 44 |
| 3.33 | 44 |
| 3.21 | 47 |
| 2.94 | 8 |

EXAMPLE 5

10 g of the product of Example 1 which has been dried beforehand for a short time in the air and has a loss on ignition of 44.2% are added to 190 g of water, and the mixture is titrated with 0.5 M $H_2SO_4$. After each addition, a waiting period is allowed, until the pH remains constant to two places after the decimal point for at least 2 minutes. As a result, the titration takes several hours. Table 5 shows the titration values. With the aid of a graph, an equivalence value of 150 mmol of $Na^+$/100 g of ignited product can be determined from the point of inflection of the curve at pH 4.5. The ion exchange capacity determined is about 95 mmol of $Na^+$/mol of $SiO_2$, corresponding to an $SiO_2$:$Na_2O$ ratio, or $SiO_2$:$2H^+$ ratio (exchangeable protons), of 21:1.

The X-ray diffraction pattern after titration with acid and drying in the air is shown in Table 1.

TABLE 5

| ml of 0.5 M $H_2SO_4$ | pH | mmol of (exchanged) $Na^+$ ions/100 g of ignited product |
|---|---|---|
| 0.00 | 10.22 | 0.0 |
| 1.00 | 9.25 | 17.9 |
| 2.00 | 8.32 | 35.8 |
| 3.00 | 7.52 | 53.8 |
| 4.00 | 7.09 | 71.7 |
| 5.00 | 6.85 | 89.6 |
| 5.50 | 6.73 | 98.6 |
| 6.00 | 6.66 | 107.5 |
| 6.50 | 6.49 | 116.5 |
| 7.00 | 6.36 | 125.5 |
| 7.50 | 6.06 | 134.4 |
| 8.00 | 5.44 | 143.4 |
| 8.25 | 4.92 | 147.9 |
| 8.50 | 3.58 | 152.4 |
| 8.75 | 3.18 | 156.8 |
| 9.00 | 2.92 | 161.3 |
| 9.25 | 2.79 | 165.8 |
| 9.50 | 2.65 | 170.3 |
| 9.75 | 2.59 | 174.8 |
| 10.00 | 2.52 | 179.2 |
| 10.25 | 2.44 | 183.7 |
| 10.50 | 2.39 | 188.2 |
| 10.75 | 2.34 | 192.7 |
| 11.00 | 2.30 | 197.2 |
| 11.50 | 2.22 | 206.1 |
| 12.00 | 2.16 | 215.1 |

EXAMPLE 6

The titration of Example 5 is repeated. However, instead of the water, 190 g of 5% strength NaCl solution are used. Table 6 shows the titration values. In the graph, an equivalence value of 145 mmol/100 g of ignited product is determined from the point of inflection of the curve at pH 3.75. From this, an ion exchange capacity of about 91 mmol of $Na^+$/mol of $SiO_2$, corresponding to an $SiO_2:Na_2O$ ratio, or $SiO_2:2H^+$ ratio, of 22:1, can be calculated.

TABLE 6

| ml of 0.5 M $H_2SO_4$ | pH | mmol of (exchanged) $Na^+$ ions/100 g of ignited product |
|---|---|---|
| 0.00 | 8.87 | 0.0 |
| 0.5 | 8.01 | 8.9 |
| 1.0 | 7.49 | 17.8 |
| 1.5 | 7.00 | 26.6 |
| 2.0 | 6.63 | 35.5 |
| 2.5 | 6.16 | 44.4 |
| 3.0 | 6.14 | 53.3 |
| 3.5 | 5.83 | 62.1 |
| 4.0 | 5.66 | 71.0 |
| 4.5 | 5.47 | 79.9 |
| 5.0 | 5.36 | 88.8 |
| 5.5 | 5.29 | 97.7 |
| 6.0 | 5.22 | 106.5 |
| 6.5 | 5.18 | 115.4 |
| 7.0 | 5.08 | 124.3 |
| 7.5 | 4.84 | 133.2 |
| 8.0 | 4.20 | 142.0 |
| 8.5 | 2.96 | 150.9 |
| 9.0 | 2.53 | 159.8 |
| 9.5 | 2.30 | 168.7 |

TABLE 7

| ml of 1 M NaOH | pH | mmol of (exchanged) protons/100 g of ignited product |
|---|---|---|
| 0.00 | 3.26 | 0.0 |
| 1.00 | 4.98 | 15.4 |
| 2.00 | 5.40 | 30.7 |
| 3.00 | 5.60 | 46.1 |
| 4.00 | 5.68 | 61.4 |
| 5.00 | 5.84 | 76.8 |
| 6.00 | 6.19 | 92.1 |
| 6.50 | 6.46 | 99.8 |
| 7.00 | 6.76 | 107.5 |
| 7.50 | 7.08 | 115.2 |
| 8.00 | 7.37 | 122.9 |
| 8.50 | 7.76 | 130.5 |
| 9.00 | 8.25 | 138.2 |
| 9.25 | 8.55 | 142.0 |
| 9.50 | 8.77 | 145.9 |
| 9.75 | 9.10 | 149.7 |
| 10.10 | 9.60 | 155.1 |
| 10.25 | 9.78 | 157.4 |
| 10.50 | 9.93 | 161.2 |
| 10.75 | 10.30 | 165.1 |
| 11.00 | 10.58 | 168.9 |
| 11.25 | 10.75 | 172.8 |
| 11.50 | 10.95 | 176.6 |
| 11.75 | 11.09 | 180.4 |
| 12.00 | 11.21 | 184.3 |
| 12.25 | 11.29 | 188.1 |
| 12.50 | 11.36 | 192.0 |
| 13.00 | 11.54 | 199.6 |
| 13.50 | 11.63 | 207.3 |
| 14.00 | 11.70 | 215.0 |
| 15.00 | 11.84 | 230.3 |
| 16.00 | 11.88 | 245.7 |

EXAMPLE 7

141.44 parts by weight of precipitated silicic acid (Merck AG, Darmstadt, Cat. No. 657; loss on ignition about 15%) are added to 1,479 parts by weight of water, after which 32 parts by weight of NaOH are introduced. This corresponds to a molar composition of 0.20 $Na_2O:SiO_2:42\ H_2O$.

The mixture is heated to 200° C. in a stainless steel autoclave which still contains residues of crystalline sodium silicate from a corresponding previous experiment, and is stirred. The silicic acid dissolves with formation of sodium silicate.

After a total reaction time of 4 hours, the reaction mixture is filtered, and the product is washed, and dried at 100° C. The X-ray diffraction spectrum corresponds approximately to that shown in Table 2 (strong line at $3.44 \cdot 10^{-8}$ cm).

By titration with 0.5 M $H_2SO_4$, an ion exchange capacity of about 142 mmol of $Na^+$/100 g of ignited product is determined. This gives an overall composition of $Na_2Si_xO_{2x+1}$, where x=22.4, and an atomic ratio Na/Si of 0.089.

EXAMPLE 8

(comparative example)

In the two Examples below, the intention is to compare the novel silicates described above with magadiite-like sheet silicates. Example 8 is intended to demonstrate that the crystallization of the sodium silicate is greatly influenced by the addition of seed crystals.

The sodium silicate is prepared from a reaction mixture having the same educt composition as in Example 1. Seed crystals of a magadiite-like silicate from a previous experiment are added to the reaction mixture. The reaction mixture is stirred for 19 hours at 165° C., cooled and then filtered, and the product is washed with water and sucked dry on a filter. 10 g of the mother liquor from the reaction mixture, diluted with 250 ml of water, have a pH of 10.4. The X-ray diffraction pattern of the product which has been dried for a short time in the air is shown in Table 8. The filter-moist product, which shows a weight loss of 61.3% on ignition (above 1,000° C.), is titrated with sulfuric acid analogously to Example 5. Table 9 shows the titration values. In the graph, an equivalence value of 215 meq/100 g of ignited product is determined from the point of inflection of the curve at pH 5.0. Including the composition determined from the titration for the $SiO_2$ content of the sample, an ion exchange capacity of 138 mmol of $Na^+$/mol of $SiO_2$, corresponding to an $SiO_2:Na_2O$ ratio of 14.5:1, is determined.

TABLE 8

| d ($10^{-8}$ cm) | I/Io |
| --- | --- |
| 15.5 | 100 |
| 7.76 | 13 |
| 5.15 | 20 |
| 4.69 | 8 |
| 4.44 | 10 |
| 4.23 | 7 |
| 3.63 | 18 |
| 3.54 | 24 |
| 3.44 | 79 |
| 3.30 | 49 |
| 3.14 | 65 |
| 2.81 | 11 |
| 2.58 | 8 |
| 2.34 | 6 |

TABLE 9

| ml of 0.5 M $H_2SO_4$ | pH | mmol of (exchanged) $Na^+$ ions/100 g of ignited product |
| --- | --- | --- |
| 0.00 | 10.59 | 0.0 |
| 1.00 | 9.81 | 25.8 |
| 2.00 | 9.13 | 51.7 |
| 3.00 | 7.28 | 77.5 |
| 4.45 | 6.73 | 115.0 |
| 5.00 | 6.61 | 129.2 |
| 6.00 | 6.54 | 155.0 |
| 7.00 | 6.40 | 180.8 |
| 8.00 | 6.01 | 206.7 |
| 8.50 | 3.97 | 219.6 |
| 9.00 | 2.95 | 232.5 |
| 9.25 | 2.76 | 239.0 |
| 0.50 | 2.65 | 245.4 |
| 9.75 | 2.55 | 251.9 |
| 10.00 | 2.48 | 258.2 |
| 10.50 | 2.34 | 271.7 |
| 11.00 | 2.16 | 297.1 |
| 12.00 | 2.09 | 310.0 |
| 12.50 | 2.03 | 322.9 |
| 13.00 | 1.98 | 335.8 |

EXAMPLE 9

(comparative example)

100 g of moist product from Example 8 are added to 200 ml of 5% strength hydrochloric acid, and the mixture is stirred for 1.25 hours at room temperature. The product is filtered and added once again to the same amount of hydrochloric acid, the mixture is stirred for 25 hours and filtered, and the product is thoroughly washed twice with water by stirring it with water and washing it during filtration. (X-ray spectrum of the product which has been dried for a short time in the air is shown in Table 10). The product is then sucked dry. 10.0 g (loss on ignition 57.1%) are added to 190 ml of 5% strength NaCl solution, and the mixture is then titrated with 1 M NaOH. Table 11 shows the titration values. In the graph, an equivalence value of 235 mmol of $H^+$/100 g of ignited product is determined from the point of inflection of the curve at pH 8.3. From this, an ion exchange capacity of about 144 meq/mol of $SiO_2$, corresponding to an $SiO_2:2H^+$ ratio, or an $SiO_2:Na_2O$ ratio, of 13.9:1, is determined.

The $SiO_2:Na_2O$ composition determined by elemental analysis is 13.4 to 14.4 for natural as well as synthetic magadiite (Lagaly et al., Am. Mineral., 60, 642-649 (1975)). The ratio of 14.5:1 or 13.9:1 determined from the ion exchange capacity of the sodium salt of Example 8 or of the free acid of Example 9, respectively, is in good agreement with these values.

TABLE 10

| d ($10^{-8}$ cm) | I/Io |
| --- | --- |
| 12.1 | 11 |
| 7.42 | 5 |
| 5.55 | 6 |
| 4.35 | 8 |
| 3.69 | 17 |
| 3.62 | 18 |
| 3.62 | 18 |
| 3.43 | 100 |
| 3.25 | 16 |
| 3.21 | 16 |
| 3.18 | 15 |

TABLE 11

| ml of 1 M NaOH | pH | mmol of (exchanged) protons/100 g of ignited product |
| --- | --- | --- |
| 0.00 | 2.21 | 0.0 |
| 1.00 | 4.40 | 23.3 |
| 2.00 | 5.26 | 46.7 |
| 3.00 | 5.44 | 70.0 |
| 4.00 | 5.55 | 93.3 |
| 5.00 | 5.62 | 116.6 |
| 6.00 | 5.69 | 140.0 |
| 7.00 | 5.82 | 163.3 |
| 7.25 | 5.89 | 169.1 |
| 7.50 | 5.88 | 174.9 |
| 7.75 | 5.91 | 180.8 |
| 8.00 | 5.99 | 186.6 |
| 8.25 | 6.12 | 192.4 |
| 8.50 | 6.20 | 198.3 |
| 8.75 | 6.44 | 204.1 |
| 9.00 | 6.57 | 210.0 |
| 9.25 | 6.82 | 215.8 |
| 9.50 | 7.17 | 221.6 |
| 9.75 | 7.55 | 227.4 |
| 10.00 | 8.05 | 233.3 |
| 10.25 | 8.70 | 239.1 |
| 10.50 | 9.15 | 244.9 |
| 10.75 | 9.51 | 250.8 |
| 11.00 | 9.88 | 256.6 |
| 11.25 | 10.15 | 262.4 |
| 11.50 | 10.50 | 268.3 |

I claim:
1. A synthetic crystalline silicic acid which has a sheet structure and an overall composition $H_2Si_xO_{2x+1}$, wherein x denotes a number between 15 and 24, which exhibits a very strong first line in the X-ray diffraction pattern at $(3.42\pm0.1)\cdot10^{-8}$ cm and a further line at $(18\pm4)\cdot10^{-8}$ cm, the intensity of which is not more than 75% of the intensity of the first line, and which has a titratable acidity of 83 to 130 mmol of $H^+$/mol of $SiO_2$.

2. A synthetic crystalline sodium salt of the silicic acid as claimed in claim 1, which exhibits, in the X-ray diffraction pattern, at least one very strong line at $(3.42\pm0.15)\cdot10^{-8}$ cm and a further line at $(20\pm2)\cdot10^{-8}$ cm, the intensity of which is not more than 75% of the intensity of the first line, and has an exchange capacity, which can be determined by titration with sulfuric acid, of 83 to 130 mmol of sodium/mol of $SiO_2$.

3. A sodium salt as claimed in claim 2, wherein the ion exchange capacity is 83 to 105 mmol of sodium/mmol of $SiO_2$.

4. A process for the preparation of a crystalline sodium silicate having a sheet structure and an ion exchange capacity of 83–130 mmol of $Na^+$/mol of $SiO_2$, wherein an aqueous reaction mixture which contains sodium silicate, has a molar ratio of $SiO_2/Na_2O$ of 3.9:1 to 15:1 and a molar ratio $H_2O/(Na_2O+SiO_2)$ of 3:1 to 80:1 and contains 0.01 to 30% by weight, relative to the amount of $SiO_2$ in the reaction mixture employed, of seed crystals of the desired crystalline sodium silicate is prepared, this reaction mixture is heated to temperatures of 160° to 250° C., the reaction is carried out at least until, in the X-ray diffraction pattern of a sample filtered off under suction and dried at 120° C., the ratio of the intensity of the reflection at the inter-planar spacing $d_1 = (20 \pm 2) \cdot 10^{-8}$ cm to the intensity of any reflection present at the interplanar spacing $d_2 = (15.5 \pm 1.5) \cdot 10^{-8}$ cm is at least 3:1, and the reaction is terminated before the intensity of the reflection at the interplanar spacing $d_3 = (3.34 \pm 0.04) \cdot 10^{-8}$ cm reaches or exceeds the intensity of the reflection at the interplanar spacing $d_4 = (3.44 \pm 0.04) \cdot 10^{-8}$ cm.

5. The process as claimed in claim 4, wherein the reaction mixture employed has a molar ratio $SiO_2/Na_2O$ of 5:1 to 10:1.

6. A process for the preparation of the crystalline silicic acid as claimed in claim 1, wherein an alkali metal salt of the crystalline silicic acid is treated with a dilute mineral acid, and the silicic acid obtained is filtered off.

7. A crystalline sodium silicate having a sheet structure made by the process of claim 4.

* * * * *